US008874530B2

(12) United States Patent
Siwick

(10) Patent No.: US 8,874,530 B2
(45) Date of Patent: Oct. 28, 2014

(54) METHOD, COMPUTER READABLE MEDIUM AND SYSTEM FOR ALLOCATION AND MANAGEMENT OF MEMORY IN RUNTIME ENVIRONMENTS

(75) Inventor: Andreas Siwick, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 615 days.

(21) Appl. No.: 13/154,536

(22) Filed: Jun. 7, 2011

(65) Prior Publication Data
US 2012/0078972 A1    Mar. 29, 2012

Related U.S. Application Data

(60) Provisional application No. 61/344,751, filed on Sep. 29, 2010.

(51) Int. Cl.
*G06F 17/30* (2006.01)
*G06F 12/00* (2006.01)
*G06F 17/00* (2006.01)

(52) U.S. Cl.
CPC .......... *G06F 17/30946* (2013.01); *G06F 12/00* (2013.01)
USPC ........... 707/693; 709/200; 709/224; 717/128; 717/151

(58) Field of Classification Search
CPC . G06F 11/1072; G06F 12/00; G06F 12/0802; G06F 12/0877; G06F 9/30018; G06F 9/30043; G06F 9/4428; G06F 9/45508; G06F 17/30961; G06F 17/30985; G06F 21/566; G06F 8/34; G06F 8/443; G06F 9/4443; G06F 9/5016; G06F 11/3495
USPC ............ 707/693; 709/200, 224; 717/128, 151
See application file for complete search history.

(56) References Cited

U.S. PATENT DOCUMENTS 6,658,652 B1 * 12/2003 Alexander et al. ............ 717/128
8,443,352 B2 * 5/2013 Tatsubori et al. ............. 717/151

\* cited by examiner

*Primary Examiner* — Yicun Wu
(74) *Attorney, Agent, or Firm* — Harness, Dickey & Pierce

(57) ABSTRACT

A method, computer readable medium and system are disclosed. At least one embodiment of a method includes receiving one of a character and a string; determining a character string part space based on a remaining portion of a character string part capacity, of an existing array element, and a length of one of the character and the string; and one of (1) storing one of the character and the string in the existing array element if the length of one of the character and the string is less than or equal to the remaining character string part capacity of an existing array element and (2) adding a new array element and storing one of the character and the string in the new array element if the length of one of the character and the string is greater than the remaining character string part capacity of an existing array element.

20 Claims, 10 Drawing Sheets

METHOD, COMPUTER READABLE MEDIUM AND SYSTEM FOR ALLOCATION AND MANAGEMENT OF MEMORY IN RUNTIME ENVIRONMENTS

This application claims the benefit of priority under 35 U.S.C. §119 of U.S. Provisional Application No. 61/344,751, filed Sep. 29, 2010, the entire contents of which are hereby incorporated herein by reference.

BACKGROUND OF THE INVENTION

1. Field

Embodiments relate to allocation and management of memory in runtime environments for computer applications.

2. Related Art

The runtime environment for computer (e.g., .NET-based) applications manages diverse memory tasks. One of the tasks includes the management of heap memory. Typically the runtime environment manages two heaps. A first heap for small objects (SmallObjectHeap, hereinafter SOH) and a second heap for large objects (LargeObjectHeap, hereinafter LOH). All objects which require a large amount of memory (e.g., more memory than 85000 bytes) are stored in the LOH. Otherwise the objects are allocated to the SOH.

Runtime environments with automatic memory management typically include a so-called GarbageCollector (GC). The GC ensures memory that is no longer required is released at certain times. In addition, the GC compacts the heap. Compacting the heap includes defragmenting the heap to close memory gaps by moving objects in the heap memory around to fill empty gaps. Compacting the heap, however, is only applicable to the SOH. For performance reasons, the LOH is not compacted. Therefore, with some applications, the LOH requires significantly more memory due to the strong fragmentation than is actually required by the large memory requirement objects.

The use of strings in the context of runtime environment for computer (e.g., .NET-based) applications is a fundamental programming construct. Depending on the application, the string objects stored in the memory can have a considerable quantity and size. Therefore, special attention is required for these string objects with regard to their representation in the memory and the effect of their use on the memory. Large string objects (e.g., greater than 85000 bytes) are also stored in the LOH. If the high-frequency creation of short-lived large string objects is inappropriately combined with the low-frequency creation of long-lived large string objects, considerable LOH fragmentation will occur so that large fractions of the memory remain unused.

SUMMARY OF THE INVENTION

The inventors have recognized, in the context of a management system for medical workflows, numerous large strings are created which, for example, describe workflows or information on workflows. In certain circumstances this results in an unacceptable LOH fragmentation, and thus to a significant increase in main memory required by the management system for medical workflows.

To date, solutions for managing memory in runtime environment for computer (e.g., .NET-based) applications have not prevented the fragmentation LOH memories.

One embodiment of the present application includes a method to store a character string. The method includes determining a part capacity based on a memory heap management rule; determining a part space based on a remaining part capacity of an existing array element and a length of the character string; and one of (1) storing the character string in the existing array element if the length of the character string is less than or equal to the remaining part capacity of an existing array element and (2) adding a new array element and storing the character string in the new array element if the length of the character string is greater than the remaining part capacity of an existing array element.

One embodiment includes a computer readable medium. The computer readable medium includes a data structure. The data structure includes one or more character arrays, the one or more character arrays having a length based on a memory heap management rule. The data structure includes code segments that when executed by a processor cause the processor to determine a part space based on a remaining capacity of an existing character array and a length of the character string, and one of (1) storing the character string in the existing character array if the length of the character string is less than or equal to the remaining capacity of an existing character array and (2) adding a new character array to the data structure and storing the character string in the new character array if the length of the character string is greater than the remaining capacity of an existing character array.

One embodiment includes a medical workflow management system. The medical workflow management system includes a processor and a memory on which a data structure is stored. The data structure includes one or more character arrays, the one or more character arrays having a length based on a memory heap management rule. The data structure includes code segments that when executed by a processor cause the processor to determine a part space based on a remaining capacity of an existing character array and a length of the character string, and one of (1) storing the character string in the existing character array if the length of the character string is less than or equal to the remaining capacity of an existing character array and (2) adding a new character array to the data structure and storing the character string in the new character array if the length of the character string is greater than the remaining capacity of an existing character array.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
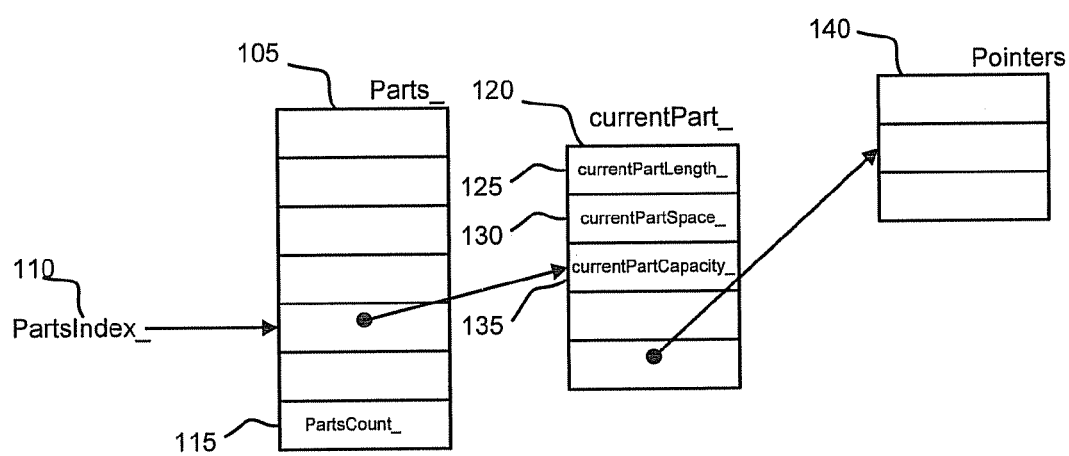
FIG. 1 illustrates a data structure for storing a character or a string according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Example embodiments reduce, minimize and/or prevent LOH fragmentation caused by runtime environments for computer (e.g., .NET-based) applications. In at least one example embodiment memory blocks allocated to strings may not be located in the LOH (e.g., containing more memory than 85000 bytes). This may be achieved by allocating memory blocks to strings that are less than the maximum size of a single object located on the SOH. The GC reduces, minimizes and/or prevents the fragmentation of the SOH by specific compacting thus reducing or even minimizing fragmentation.

At least one embodiment includes a data structure. The data structure may include one or more character arrays, the one or more character arrays may have a length based on a memory heap management rule. The data structure may include code segments that when executed by a processor cause the processor to determine a part space based on a remaining capacity of an existing character array and a length of the character string, and one of (1) storing the character string in the existing character array if the length of the character string is less than or equal to the remaining capacity of an existing character array and (2) adding a new character array to the data structure and storing the character string in the new character array if the length of the character string is greater than the remaining capacity of an existing character array.

FIG. 1 illustrates an example embodiment of a data structure 100 for storing a character or a string according to at least one example embodiment. As is shown by FIG. 1, the data structure may include a set or array of data fields. The data fields are shown as Parts_ 105. In addition, the data structure 100 may include an index indicating the part currently being accessed (e.g., string being written or read) in the data structure 100. This index is shown as PartsIndex_ 110. In addition, the data structure 100 may include a data field indicating the number of parts stored in the data structure 100. This data field is shown as PartsCount_ 115.

The data field parts_ 105 stores the string. Each part_ 105 may include a currentPart_ 120. The currentPart_ 120 may include one or more data fields. For example, the currentPart_ 120 may include currentPartLength_ 125, currentPartSpace_ 130, currentPartCapacity_ 135 and Pointers 140.

The data fields partsIndex_ 110, partsCount_ 115, currentPart_ 120, currentPartLength_ 125, currentPartSpace_ 130 and currentPartCapacity_ 135, generally contain information which is required for quick access to the data field parts_ 105. The partially present redundancy may be specifically provided in favor of an improved performance on access (e.g. the currentPartCapacity_ 135 can be calculated from currentPartSpace_ 130+currentPartLength_ 125. For example, in order not to have to carry out this operation every time currentPartCapacity_ 135 as such is also stored as a data field).

The pointers 140 may point to the character array storing each string segment. For example, each string segment may be stored in a memory that is a length based on a memory heap management rule. For example, the length may be less than the maximum size of a single object located on the SmallObjectHeap. The pointers 140 may be an array of pointers pointing to each memory location. Alternatively, the pointers may be some other list of pointers pointing to each memory location. Alternatively, there may be a single pointer pointing to an array or list of memory locations storing the string segments. The pointers 140 and each of the other data fields (e.g., currentPartSpace_ 130) may be stored in a memory that is a length based on a memory heap management rule. For example, the length may be less than the maximum size of a single object located in the SOH.

The following code listing shows an example of implementing the data structure of FIG. 1. Hereinafter, the data structure of FIG. 1 may be referred to as a "Smart String"

```
/// <summary> Smart String class preventing fragmentation of
LargeObjectHeap</summary>
public class SmartString {
    /// <summary>Indicates whether fields are
    initialized</summary>
    private bool initialized_;
    /// <summary>List of all parts contained in the
    SmartString</summary> private List<char[ ]> parts_;
    /// <summary>Index of currently used part in
    parts_</summary> private int partsIndex_ = -1;
    /// <summary>Number of used and unused parts contained in
    parts_</summary>
    private int partsCount_;
    /// <summary>Array of all characters contained in current
    part</summary>»
    private char[ ] currentPart_;
    /// <summary>Number of unused characters contained in
    currentPart_</summary>
    private int currentPartSpace_;
    /// <summary>Number of used characters contained in
    currentPart_</summary>
    private int currentPartLength_;
    /// <summary>Sum of currentPartLength_ and
    currentPartSpace_</summary>
    private int currentPartCapacity_;
}
```

At least one example embodiment includes a method. The method may include receiving one of a character and a string.

The method may include determining a character string part space based on a remaining portion of a character string part capacity, of an existing array element, and a length of one of the character and the string. The method may include one of (1) storing one of the character and the string in the existing array element if the length of one of the character and the string is less than or equal to the remaining character string part capacity of an existing array element and (2) adding a new array element and storing one of the character and the string in the new array element if the length of one of the character and the string is greater than the remaining character string part capacity of an existing array element.

Figure 2:
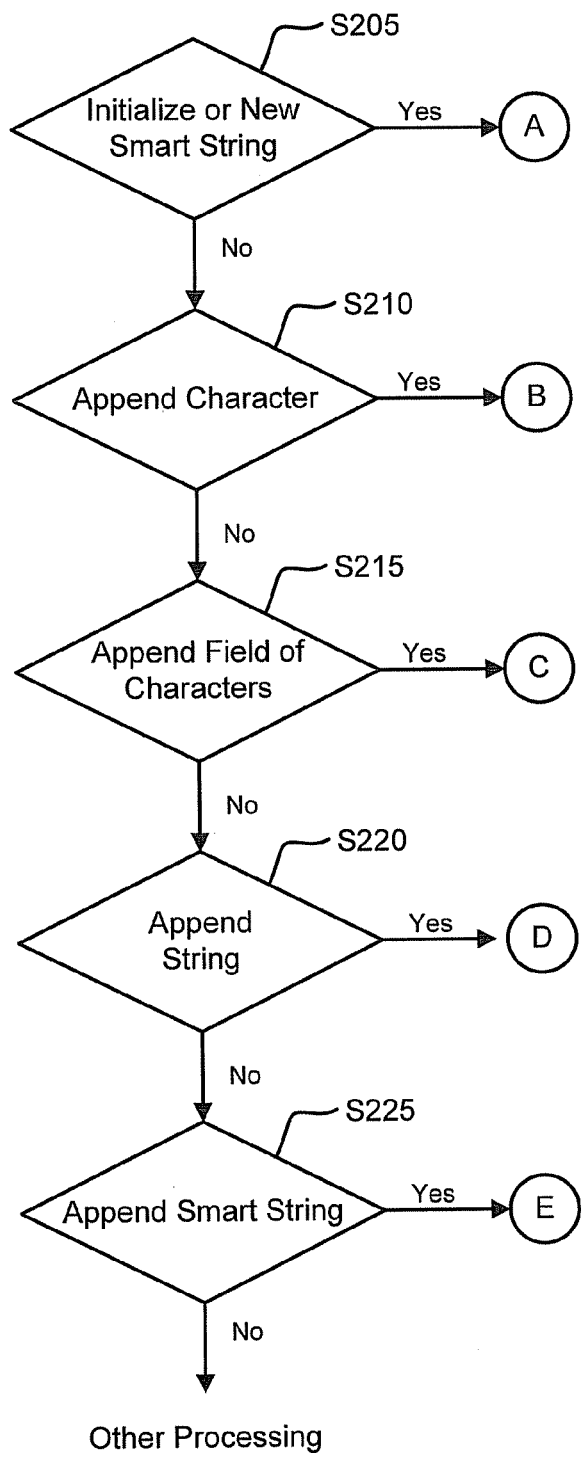
FIG. 2 illustrates a method for a managing characters and strings to reduce memory fragmentation according to at least one example embodiment.

FIGS. 2-8 illustrate an example embodiment of a method for storage of characters and strings to reduce memory fragmentation according to at least one example embodiment according to at least one example embodiment. FIG. 2 illustrates a top level method for a managing characters and strings to reduce memory fragmentation according to at least one example embodiment. In describing FIGS. 2-7 below, reference will return to FIG. 1 before sequentially referring to one of FIGS. 3-8.

Referring to FIG. 2, in step S205 a processor (e.g., a processor executing a runtime environment for computer applications, see for example processor 1110 described below) may determine if a new Smart String should be created and/or if a Smart String should be initialized. For example, the application executed by the processor may execute a call or request for a new Smart String. If a new Smart String should be created and/or if a Smart String should be initialized processing moves to step S305 (described in more detail below). Otherwise, processing continues to step S210.

In step S210, the processor may determine if a character is to be appended to the Smart String. For example, the application executed by the processor may execute a call to append a character to an existing Smart String. If a character is to be appended to the Smart String, processing moves to step S405 (described in more detail below). Otherwise, processing continues to step S215.

In step S215, the processor may determine if a field of characters is to be appended to the Smart String. For example, the application executed by the processor may execute a call to append a field of characters to an existing Smart String. If a field of characters is to be appended to the Smart String, processing moves to step S505 (described in more detail below). Otherwise, processing continues to step S220.

In step S220, the processor may determine if a string is to be appended to the Smart String. For example, the application executed by the processor may execute a call to append a string to an existing Smart String. If a string is to be appended to the Smart String, processing moves to step S605 (described in more detail below). Otherwise, processing continues to step S225.

In step S225, the processor may determine if a Smart String is to be appended to the Smart String. For example, the application executed by the processor may execute a call to append a Smart String to an existing Smart String. If a Smart String is to be appended to the Smart String, processing moves to step S705 (described in more detail below). Otherwise, some other processing is performed (e.g., an error routine may run because of an invalid call).

Figure 3:
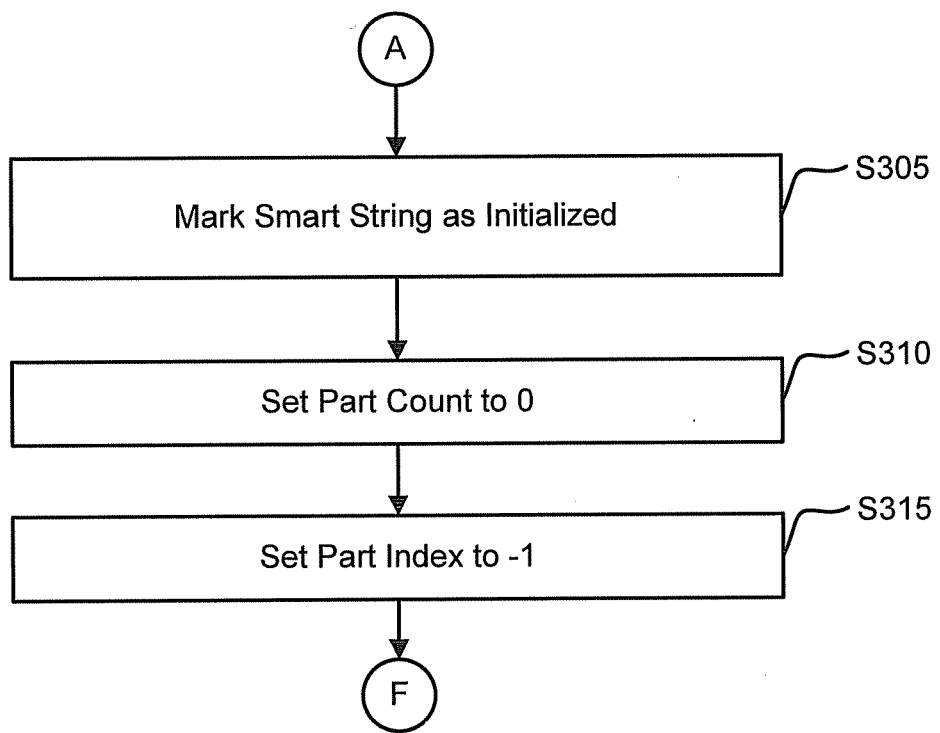
FIG. 3 illustrates a method for initializing storage of characters and strings according to at least one example embodiment.

FIG. 3 illustrates an example embodiment of a method for initializing storage of characters and strings according to at least one example embodiment. For example, the Smart String may be initialized if a new Smart String is required. Alternatively, the Smart String may be initialized if an existing Smart String is deleted and replaced by an existing Smart String and/or a new Smart String.

In step S305, the processor may mark the Smart String as initialized. For example, the processor may, in the code listing shown above, set a Boolean variable (e.g., initialized_) to "True".

In step S310, the processor may set a part count to zero (0). For example, in the data structure of FIG. 1 partsCount_ 115 may be set to zero. In step S315, the processor may set a part index to minus one (−1). For example, in the data structure of FIG. 1 partsIndex_ 110 may be set minus one (−1).

The following code listing shows an example of implementing the steps of FIG. 3.

```
private void Init( )
{
    if (this == EMPTY)
    {
        throw new Exception("SmartString.EMPTY is not allowed to be modified.");
    }
    this.initialized = true;
    this.partList = new List<char[ ]>( );
    this.partsIndex = −1;
    this.partsCount = 0;
    AdvanceToNextPart( );
}
```

Figure 4:
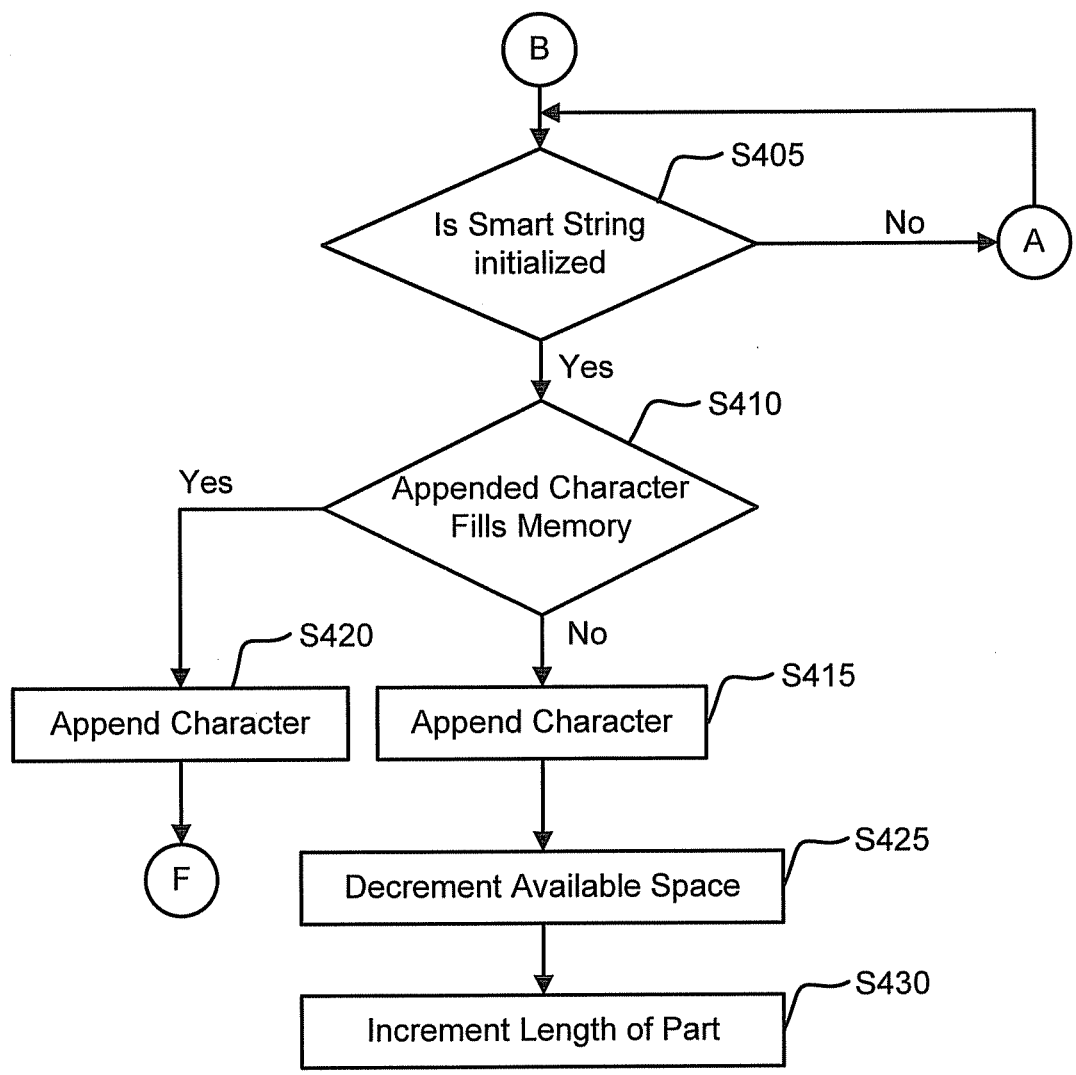
FIG. 4 illustrates a method for storing a character to a stored character or string according to at least one example embodiment.

FIG. 4 illustrates an example embodiment of a method for storing a character to a stored character or stored string according to at least one example embodiment. For example, assuming a Smart String exists, a character (e.g., a single digit number or a single letter) may be appended to the existing Smart String. For example, the number '1' representing a first image (e.g., X-Ray image) may be appended to the Smart String.

In step S405, the processor may determine if the Smart String is (or has been) initialized. For example, the Smart String may determine if the Boolean variable initialize_ is "True". If the Smart String is not initialized processing continues to step S305 (as described above with regard to FIG. 3) and the Smart String is initialized. Upon completion of initialization of the Smart String, processing returns to step S405. Otherwise, if the Smart String is initialized processing continues to step S410.

In step S410, the processor may determine if appending the character will fill the memory. For example, the processor determines if upon appending the character, the length of the string segment is equal to the maximum size of a single object located in the SOH. For example, if the available space (e.g., currentPartSpace_ 130) equals one, then after appending the character, the available space will be zero. If appending the character will fill the memory, processing continues to step S420 and the processor appends the character to the Smart String. For example, the character is added to the memory pointed to by pointer 140. Following step S420, processing moves to step S805 described in more detail below.

Otherwise, if appending the character does not fill the memory, processing continues to step S415 and the processor appends the character to the Smart String. For example, the character is added to the memory pointed to by pointer 140. In step S425, the processor decrements the available space. For example, the processor subtracts one from the value of currentPartSpace_ 130. In step S430, the processor increments the length of the part. For example, the processor adds one to the value of currentPartLength_ 125.

The following code listing shows an example of implementing the steps of FIG. 4.

```
internal void Append(char character)
{
    // check whether character can be copied to current part and
still space left
    if (this.currentPartSpace > 1)
    {
        this.currentPart[this.currentPartLength] = character;
        this.currentPartSpace--;
        this.currentPartLength++;
    }
    // check whether current part is full after appending
    else if (this.currentPartSpace == 1)
    {
        this.currentPart[this.currentPartLength] = character;
        AdvanceToNextPart( );
    }
    // instance is non-initialized
    else
    {
        Init( );
        Append(character);
    }
}
```

Figure 5:
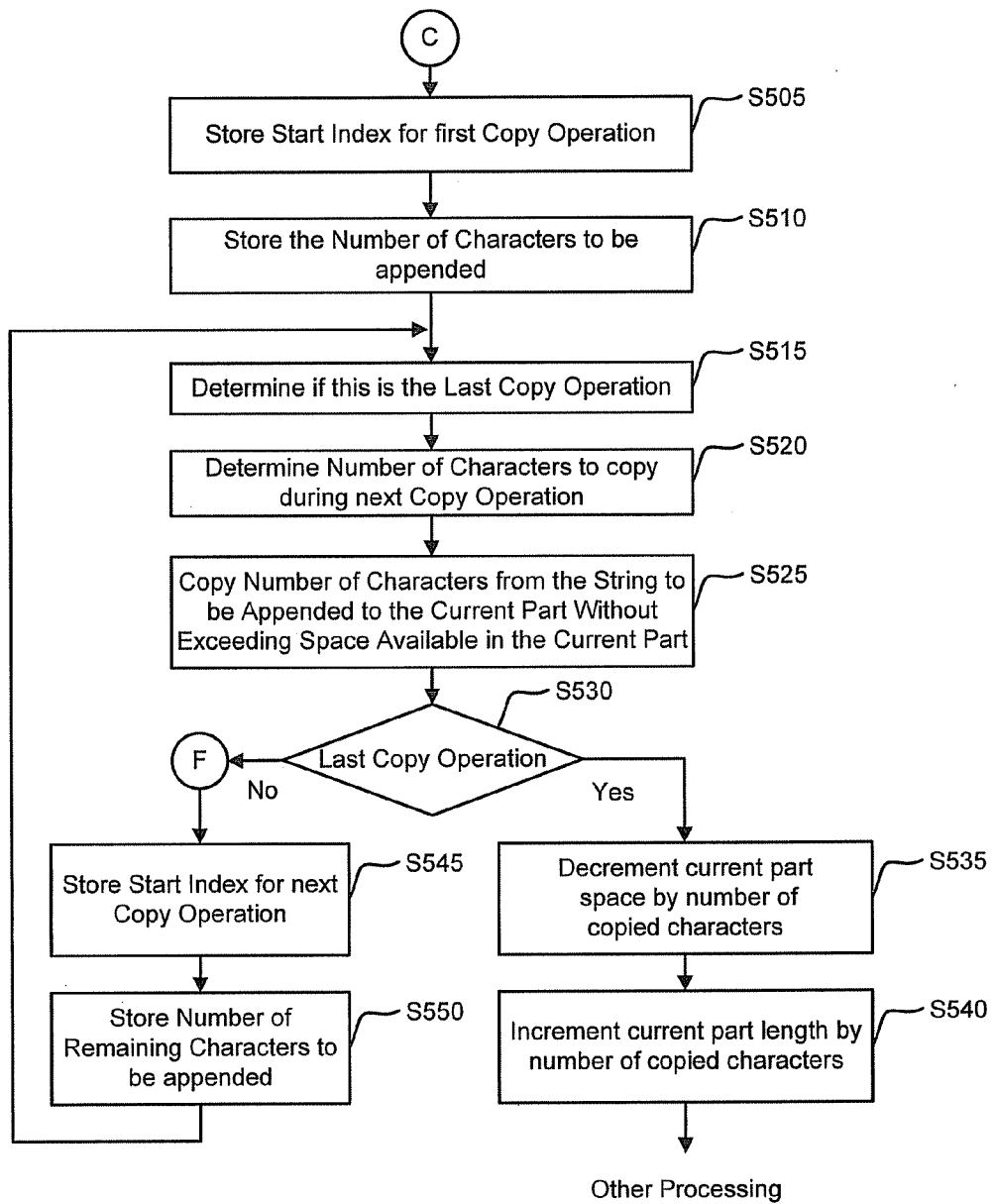
FIG. 5 illustrates a method for storing a character or a string to a stored character or string according to at least one example embodiment.

FIG. 5 illustrates an example embodiment of a method for storing a character or a string to a stored character or string according to at least one example embodiment. For example, assuming a Smart String exists, a sub set of a character array or string (e.g., a double digit number or a sentence) may be appended to the existing Smart String. For example, the sentence 'John is 45' representing the name and age of a patient may be appended to the Smart String. However, the patient name may be repetitive. Therefore, to store only the patient age may be desirable.

In step S505, the processor may store a start index for the first copy operation. For example, the processor may generate a local or temporary integer variable to store the start index. For example, the start index may be '8' for the example of storing the age shown above.

In step S510, the processor may store the number of characters to be appended. For example, the processor may generate a local or temporary integer variable to store the number of characters to be appended. For example, the number of characters to be appended may be '2' for the example of storing the age shown above.

In step S515, the processor may determine if the current copy operation is the last copy operation. For example, if the copy operation is copying characters from the string one at a time, is this the last character in the string. From the example above, is the '5' to be copied in this copy operation.

In step S520, the processor may determine a number of characters to copy during a next copy operation. For example, the processor may be configured to copy one or more characters. The processor may be configured to copy one or more characters based on, for example, a parameter passed during the copy call, or alternatively, an initial or global variable setting. For example, in the age example above, the processor may copy the '45' as one copy operation. Therefore, the processor may determine the number of character to copy as '2'. Alternatively, the processor may copy the '4' in one copy operation and the '5' in another copy operation. Therefore, the processor may determine the number of character to copy as '1'.

In step S525, the processor may copy the number of characters from the string to be appended to the current part without exceeding space available in the current part. For example, in the age example above, the processor may copy the '45' as one copy operation. Alternatively, the processor may copy the '4' in one copy operation and the '5' in another copy operation. However, the processor prevents exceeding the space available in the current part. For example, if only one character space is available, and the '45' is set to be copied, only the 4 will be copied. For example, in this situation, in step S510 the processor may determine the number of characters to be copied as '1' and in step S515, the processor may determine this copy operation is not the last copy operation.

In S530, if this copy operation is the last copy operation, the processor branches processing to step S535. In step S535 the processor decrements the available space by the number of copied characters. For example, the processor subtracts the number of copied characters from the value of currentPartSpace_ 130. In step S540, the processor increments the length of the part by the number of copied characters. For example, the processor adds the number of copied characters to the value of currentPartLength_ 125.

In S530, if this copy operation is not the last copy operation, the processor branches processing to step S805 described in more detail below. Upon completion of the steps associated with FIG. 8, described in more detail below, processing continues at step S545.

In step S545, the processor may store a start index for the next copy operation. For example, the processor may store a new value in the local or temporary integer variable described above. In step S550, the processor stores the remaining number of characters to be appended. For example, the processor may store a new value the local or temporary integer variable to store the number of characters as described above. Upon the completion of step S550, processing returns to step S515.

The following code listing shows an example of implementing the steps of FIG. 5.

```
internal void Append(char[ ] value, int valueIndex, int valueLength)
{
    // initialize if required
    if (!this.initialized)
    {
        Init( );
    }
    // check whether value is not null
    if (value != null)
    {
        int sourceIndex = valueIndex;
        int remainingSourceLength = valueLength;
        while (true)
        {
            // determine whether space would be left in current
part after copying remaining source
            bool isCurrentPartSpaceLeft =
(remainingSourceLength < this.currentPartSpace);
            // determine charsToCopyCount
            int charsToCopyCount = (isCurrentPartSpaceLeft) ?
remainingSourceLength : this.currentPartSpace;
            // copy contents
            Array.Copy(value, sourceIndex, this.currentPart,
this.currentPartLength, charsToCopyCount);
            // check whether remaining source could be copied to
current part and still space left
            if (isCurrentPartSpaceLeft)
            {
                this.currentPartSpace -= charsToCopyCount;
                this.currentPartLength += charsToCopyCount;
                break;
            }
```

```
        else
        {
            AdvanceToNextPart( );
        }
        // adjust sourceIndex and remainingSourceLength
        sourceIndex += charsToCopyCount;
        remainingSourceLength -= charsToCopyCount;
        }
    }
}
```

Figure 6:
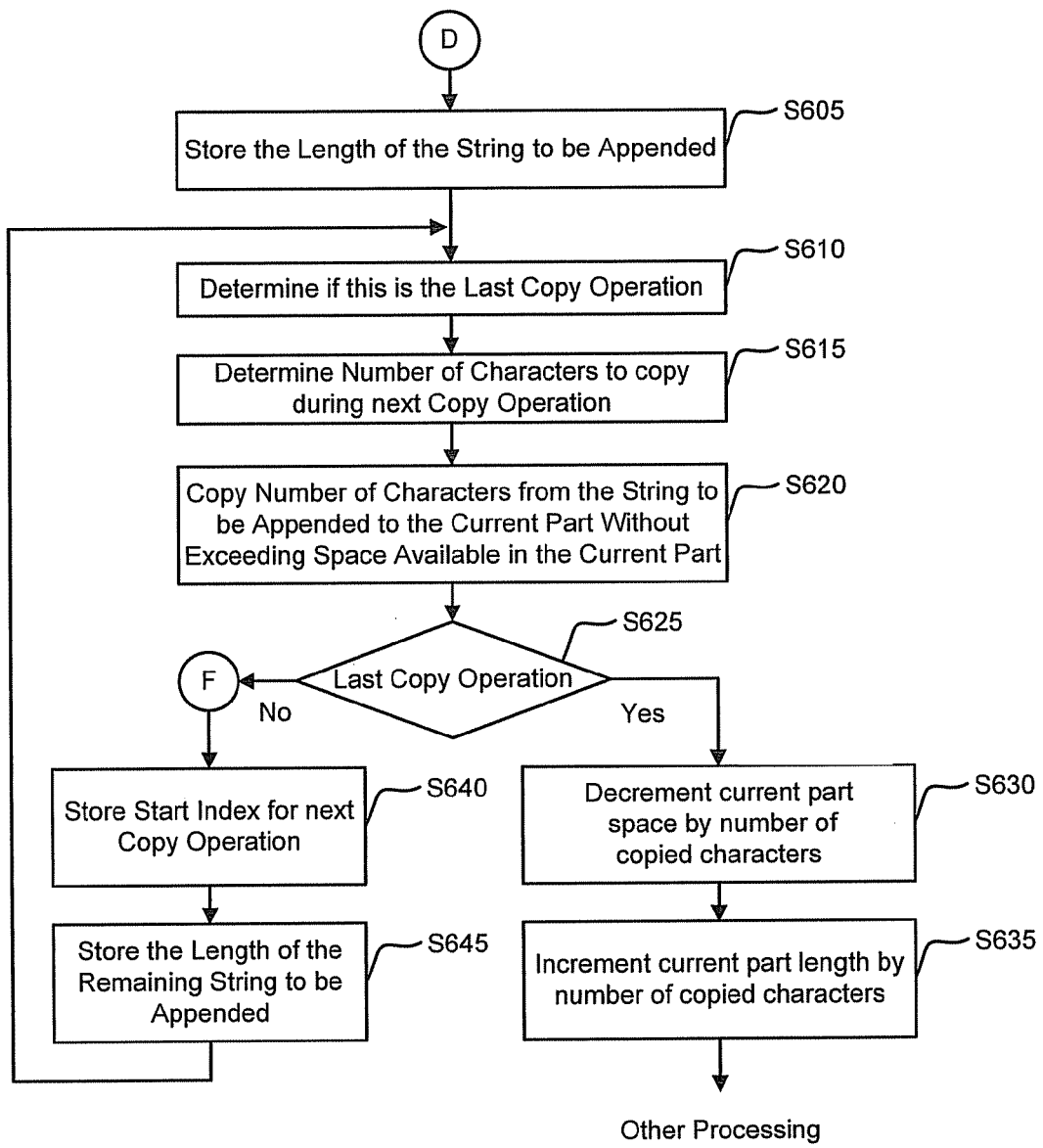
FIG. 6 illustrates a method for storing a string to a stored character or string according to at least one example embodiment.

FIG. 6 illustrates an example embodiment of a method for storing a string to a stored character or string according to at least one example embodiment. For example, assuming a Smart String exists, a string (e.g., a double digit number or a sentence) may be appended to the existing Smart String. For example, the sentence 'John is 45' representing the name and age of a patient may be appended to the Smart String.

In step S605, the processor may store the length of the string to be appended. For example, the processor may generate a local or temporary integer variable to store the number of characters to be appended. For example, the number of characters to be appended may be '10' for the example of storing the patient name and age shown above.

In step S610, the processor may determine if the current copy operation is the last copy operation. For example, if the copy operation is copying characters from the string one at a time, is this the last character in the string. From the example above, is the '5' to be copied in this copy operation.

In step S615, the processor may determine a number of characters to copy during a next copy operation. For example, the processor may be configured to copy one or more characters. The processor may be configured to copy one or more characters based on, for example, a parameter passed during the copy call, or alternatively, an initial or global variable setting. For example, in the age example above, the processor may copy the sentence 'John is 45' as one copy operation. Therefore, the processor may determine the number of character to copy as '10'. Alternatively, the processor may copy the 'J' in one copy operation and the 'o' in another copy operation and so on. Therefore, the processor may determine the number of character to copy as '1'.

In step S620, the processor may copy the number of characters from the string to be appended to the current part without exceeding space available in the current part. For example, in the age example above, the processor may copy the '45' as one copy operation. Alternatively, the processor may copy the '4' in one copy operation and the '5' in another copy operation. However, the processor prevents exceeding the space available in the current part. For example, if only three character spaces are available, and the 'John is 45' is set to be copied, only the 'Joh' will be copied. For example, in this situation, in step S615 the processor may determine the number of characters to be copied as '3' and in step S610, the processor may determine this copy operation is not the last copy operation.

In S625, if this copy operation is the last copy operation, the processor branches processing to step S630. In step S630 the processor decrements the available space by the number of copied characters. For example, the processor subtracts the number of copied characters from the value of currentPartSpace_ 130. In step S635, the processor increments the length of the part by the number of copied characters. For example, the processor adds the number of copied characters to the value of currentPartLength_ 125.

In S625, if this copy operation is not the last copy operation, the processor branches processing to step S805 described in more detail below. Upon completion of the steps associated with FIG. 8, described in more detail below, processing continues at step S640.

In step S640, the processor may store a start index for the next copy operation. For example, the processor may store a new value in the local or temporary integer variable described above. In step S645, the processor stores the remaining number of characters to be appended. For example, the processor may store a new value the local or temporary integer variable to store the number of characters as described above. Upon the completion of step S645, processing returns to step S610.

The following code listing shows an example of implementing the steps of FIG. 6.

```
internal void Append(string value)
{
    // initialize if required
    if (!this.initialized)
    {
        Init( );
    }
    // check whether value is not null
    if (value != null)
    {
        int sourceIndex = 0;
        int remainingSourceLength = value.Length;
        while (true)
        {
            // determine whether space would be left in current
   part after copying remaining source
            bool isCurrentPartSpaceLeft =
   (remainingSourceLength < this.currentPartSpace);
            // determine charsToCopyCount
            int charsToCopyCount = (isCurrentPartSpaceLeft) ?
   remainingSourceLength : this.currentPartSpace;
            // copy contents
            value.CopyTo(sourceIndex, this.currentPart,
   this.currentPartLength, charsToCopyCount);
            // check whether remaining source could be copied to
   current part and still space left
            if (isCurrentPartSpaceLeft)
            {
                this.currentPartSpace -= charsToCopyCount;
                this.currentPartLength += charsToCopyCount;
                break;
            }
            else
            {
                AdvanceToNextPart( );
            }
            // adjust sourceIndex and remainingSourceLength
            sourceIndex += charsToCopyCount;
            remainingSourceLength -= charsToCopyCount;
        }
    }
}
```

Figure 7:
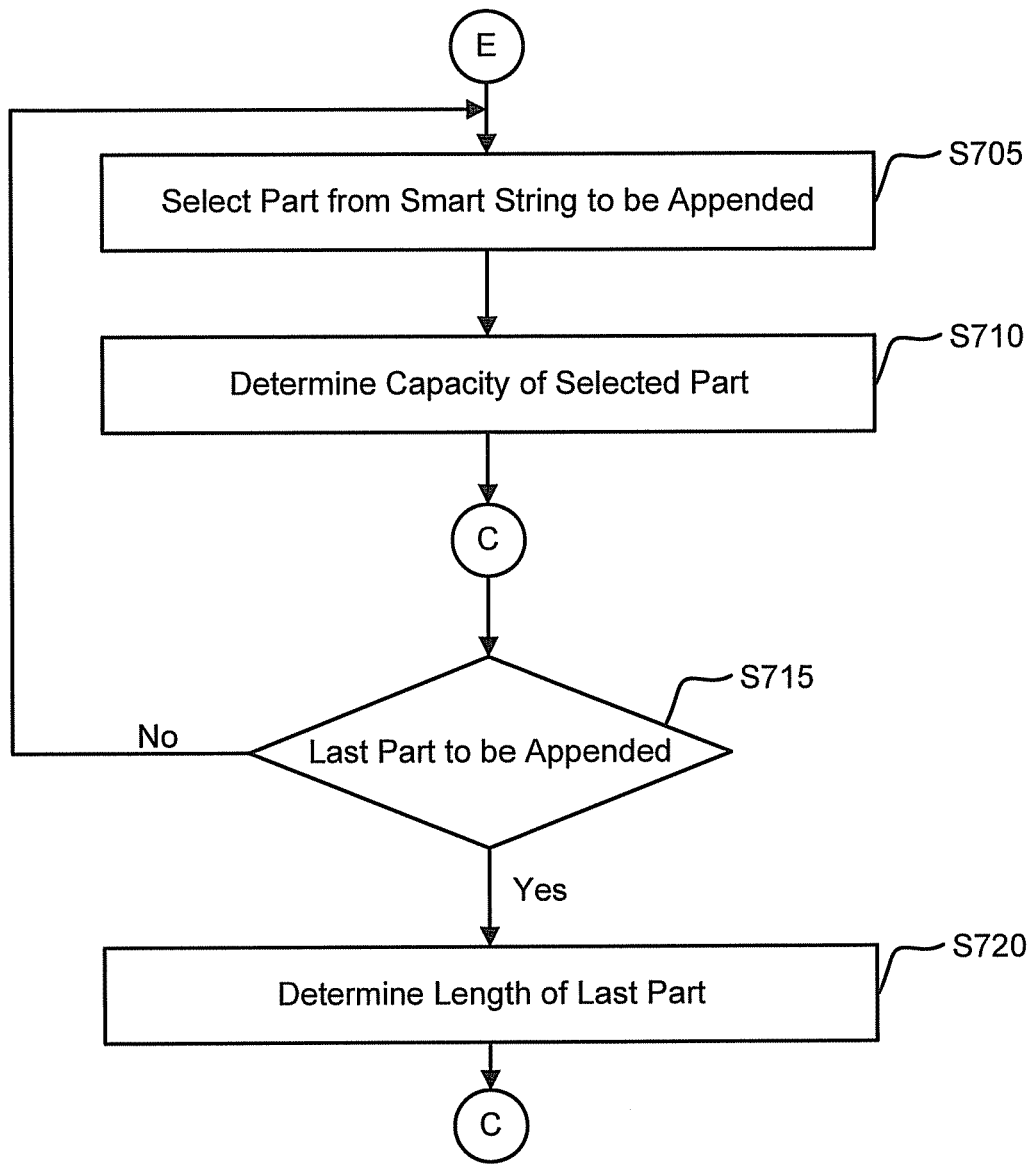
FIG. 7 illustrates a method for storing a character or a string to a stored character or string according to at least one example embodiment.

FIG. 7 illustrates an example embodiment of a method for storing a character or a string to a stored character or string according to at least one example embodiment. For example, assuming a first Smart String exists, a second Smart String may be appended to the existing Smart String. For example, if a Smart String is associated with patient records, two patient records may be merged. For example, a patient record from a hospital may be merged with a patient record from a doctors' office.

In step S705, the processor may select a part from the Smart String to be appended. For example, if the Smart String includes more than one part and this is an initial iteration, the processor may select the first part in the list of parts 105.

In step S710, the processor may determine the capacity of the selected part. For example, the processor may read the value of currentPartLength_ 125 for the selected part 105. Process control then moves to step S505 described above with regard to FIG. 5. Upon completion of step S540 as described above with regard to FIG. 5 processing returns to step S715.

In step S715, the processor may determine if the selected part is the last part to be appended. If the selected part is the last part to be appended, in step S720 the processor may determine the capacity of the last part. For example, the processor may read the value of currentPartLength_ 125 for the last part 105. Process control then moves to step S505 described above with regard to FIG. 5. Otherwise, if in step S715 the processor determines the selected part is not the last part to be appended, processing returns to step S705.

The following code listing shows an example of implementing the steps of FIG. 7. The code listing includes the function "Append" which is described above with regard to FIG. 5.

```
internal void Append(SmartString value)
{
    // check whether value is not null
    if (value != null && value.initialized)
    {
        // copy all parts but last one
        for (int i = 0; i < value.partsIndex; i++)
        {
            char[ ] part = value.partList[i];
            Append(part, 0, part.Length);
        }
        // copy last part
        Append(value.partList[value.partsIndex], 0,
 value.currentPartLength);
    }
}
```

Figure 8:
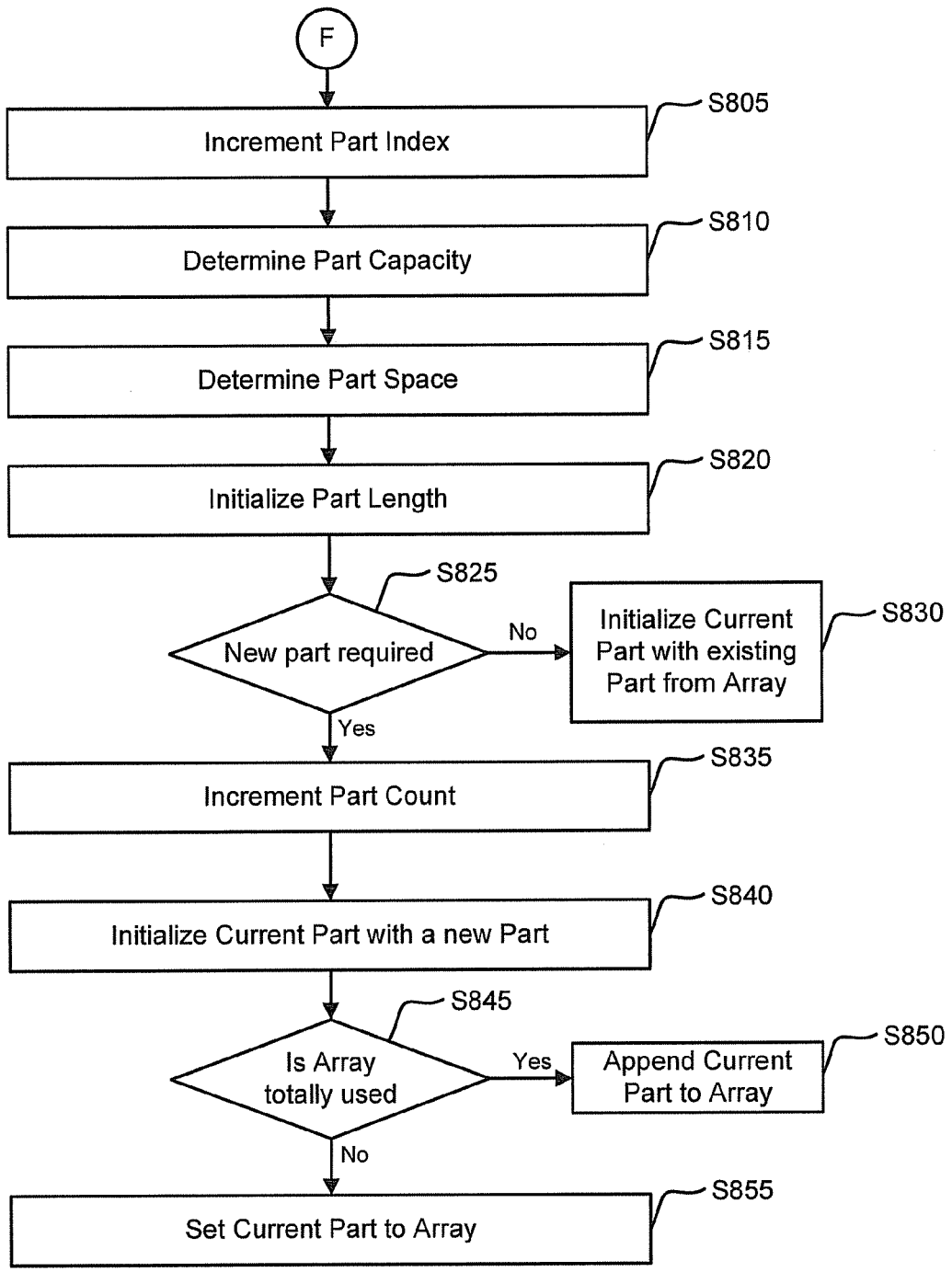
FIG. 8 illustrates a method for storing a character or a string to a stored character or string according to at least one example embodiment.

FIG. 8 illustrates an example embodiment of a method for storing a character or a string to a stored character or string according to at least one example embodiment. As indicated above, in each of FIGS. 3-6 processing includes the steps of FIG. 8 described below.

In step S805, the processor may increment the part index. For example, the processor may increment PartsIndex_ 110 by adding one to the value of PartsIndex_ 110. In step S810, the processor may determine the part capacity. For example, the processor may read the value associated with currentPartCapacity_ 135. In step S815, the processor may determine the part space. For example, the processor may read the value associated with currentPartSpace_ 130. In step S820, the processor may initialize the part length. For example, the processor may set the value associated with currentPartLength_ 125 to zero.

In step S825, the processor may determine if a new part is required. For example, if the part index is equal to the part count, a new part may be required. For example, if PartsCount_ 115 is equal to PartsIndex_ 110, a new part may be required. If a new part is not required, in step S830, the processor may initialize the current part with an existing part from the part array. For example, the current part may be an initialized part from the parts list Parts_ 105. Otherwise, if a new part is required, processing continues to step S835.

In step S835, the processor may increment the part count. For example, the processor may increment PartsCount_ 115 by adding one to the value of PartsCount_ 115. In step S840, the processor may initialize the current part with a new part. For example, the processor may perform the steps described above with regard to FIG. 3.

In step S845 the processor may determine if the part array is totally used. For example, the processor may determine if the parts list Parts_ 105 is full. If the array is totally used, processing moves to step S850.

In step S850, the current part is appended to the part array. In other words, the new part is added to the parts list Parts_ 105 expanding the capacity of the parts list Parts_ 105. Otherwise, if the array is not totally used, processing moves to step S855. In step S855, the current part is set to the array of parts.

The following code listing shows an example of implementing the steps of FIG. 8.

```
private void AdvanceToNextPart( )
{
    this.partsIndex++;
    bool newPartRequired = (this.partsIndex == this.partsCount);
    this.currentPartCapacity = GetPartCapacity(this.partsIndex);
    this.currentPartSpace = this.currentPartCapacity;
    this.currentPartLength = 0;
    if (newPartRequired)
    {
        this.partsCount++;
        this.currentPart = new char[this.currentPartCapacity];
        if (this.partsIndex < this.partList.Count)
        {
            this.partList[this.partsIndex] = this.currentPart;
        }
        else
        {
            this.partList.Add(this.currentPart);
        }
    }
    else
    {
        this.currentPart = this.partList[this.partsIndex];
    }
}
```

As one skilled in the art will appreciate, using the Smart String data structure illustrated in FIG. 1 may require the conversion of the Smart String back to a string for use in a standard runtime environment. Those skilled in the art will appreciate that in knowing the structure of the data is all that is required to develop a conversion process. For example, a process for conversion may be to loop through each of the Pointers 140 beginning with the first pointer and ending with the last pointer. The memory associated with each pointer may be read and the result may be appended to the previous result.

The following code listing shows an example of implementing a conversion of a Smart String to a known string.

```
internal string ToString(int length)
{
    if (!this.initialized)
    {
        return string.Empty;
    }
    StringBuilder result = new StringBuilder(Length);
    bool isLastPartToCopy = false;
    int remainingCharsToCopyCount = length;
    int charsToCopyCount = 0;
    // append all parts but last one (or less)
    for (int i = 0; i < this.partsIndex; i++)
    {
        char[ ] part = this.partList[i];
        int partLength = part.Length;
        // determine whether part is the last part to copy contents
 from
        isLastPartToCopy = (remainingCharsToCopyCount <=
```

-continued

```
partLength);
        // determine charsToCopyCount
        charsToCopyCount = (isLastPartToCopy) ?
remainingCharsToCopyCount : partLength;
        // append charsToCopyCount character from part to result
        result.Append(part, 0, charsToCopyCount);
        // reduce remainingCharsToCopyCount
        remainingCharsToCopyCount -= charsToCopyCount;
        // check loop should be ended
        if (isLastPartToCopy)
        {
            break;
        }
    }
}
```

At least one example embodiment includes medical workflow management system. The medical workflow management system may include a processor (e.g., processor 1110 described below) and a memory (e.g. memory 1020 or 1120 described below) on which a data structure is stored, the data structure may include one or more character arrays, the one or more character arrays may have a length based on a memory management rule. The data structure may include code segments that when executed by the processor cause the processor to receive one of a character and a string, determine a character string part space based on a remaining portion of a character string part capacity, of an existing character array element, and a length of one of the character and the string, and one of (1) storing one of the character and the string in the existing array element if the length of one of the character and the string is less than or equal to the remaining character string part capacity of an existing array element and (2) adding a new array element and storing one of the character and the string in the new array element if the length of one of the character and the string is greater than the remaining character string part capacity of an existing array element.

Figure 9:
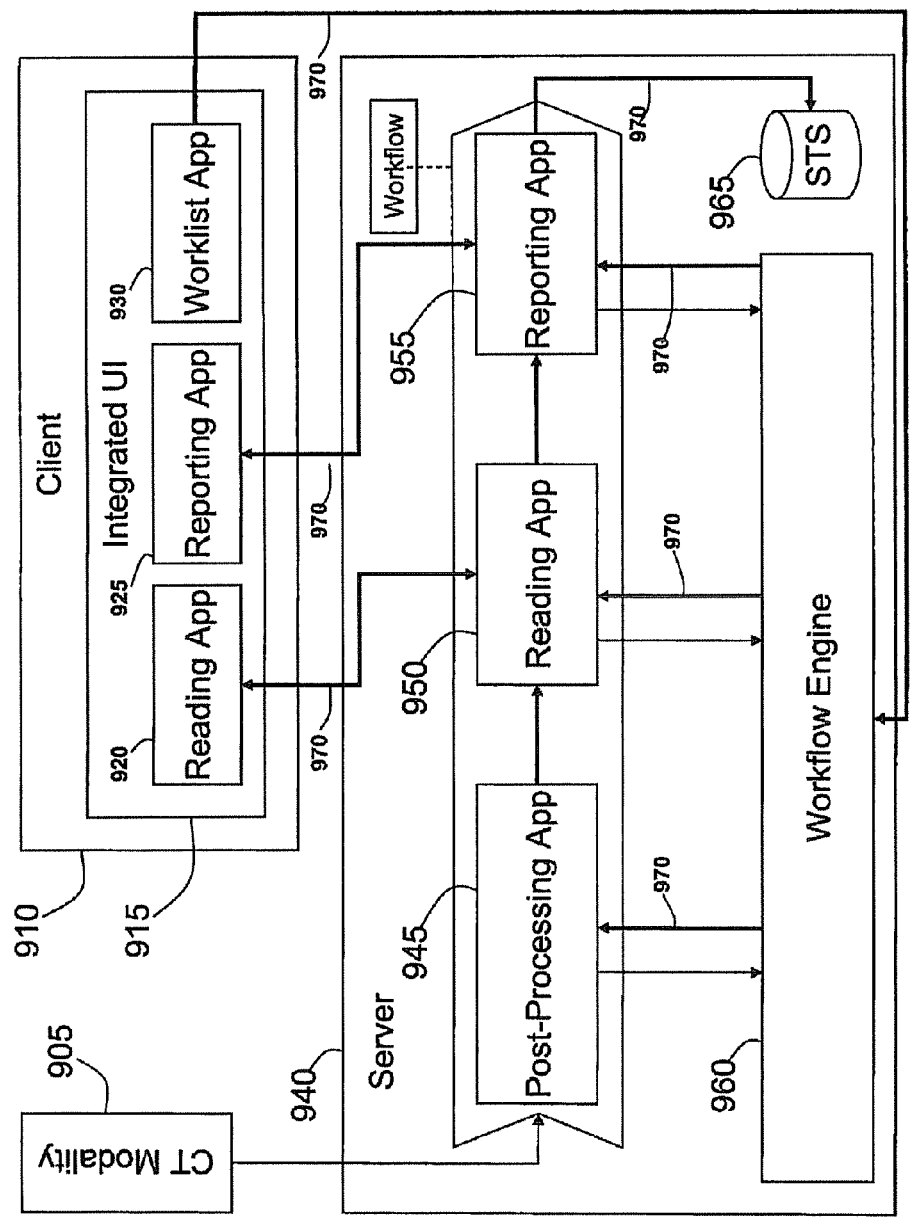
FIG. 9 illustrates a system for storing a character or a string to a stored character or string according to at least one example embodiment.

FIG. 9 illustrates an example embodiment of a system for storing a character or a string to a stored character or string according to at least one example embodiment. For example, the system may be a management system for medical workflows.

As shown in FIG. 9, the system may include an imaging modality, for example, a Computed Tomography (CT) Modality 905. The CT Modality 905 may include, for example, a CT scanner or some other imaging device (e.g., X-Ray, MRI, PET, etc.). The system may further include a client 910. The client 910 may include an integrated user interface (UI) 915. The integrated UI 915 may include one or more applications 920, 925, 930. The one or more applications 920, 925, 930 may be the processor applications executed by runtime environments where the client 910 is a computer (e.g., the electronic system 1100 described below) including a processor (e.g., processor 1110 described below) to execute the one or more applications 920, 925, 930. The one or more applications 920, 925, 930 may be, for example, a reading application, a reporting application and a worklist application respectively. However, example embodiments are not limited thereto.

The system may further include a server 940. The server 940 may include an associated workflow. The workflow may include one or more applications 945, 950, 955. The one or more applications 945, 950, 955 may be the processor applications executed by runtime environments where the server 940 is a computer including a processor to execute the one or more applications 945, 950, 955. The one or more applications 945, 950, 955 may be, for example, a post-processing application, a reading application and a reporting application respectively. However, example embodiments are not limited thereto.

The server 940 may further include a workflow engine 960 and a short term storage memory 965. The workflow engine 960 may be configured to manage the interaction between the one or more applications 920, 925, 930 associated with the client 910 and the one or more applications 945, 950, 955 associated with the server 940 as well as the interactions between applications on an apparatus (e.g., server 940). The short term storage memory 965 may be a memory (e.g., RAM or a hard disk drive). The short term storage memory 965 may be configured to store information and data associated with the CT Modality 905, the client 910 and the server 940. The short term storage memory 965 may also be configured to store information and data associated with other devices that may interact with the system.

The system may further include one or more communicative links 970. The one or more communicative links 970 may be configured to communicate information and data between and within the client 910 and the server 940. As one skilled in the art will appreciate, at least one protocol for communicating over the one or more communicative links 970 may be based on XML data structures. As one skilled in the art will also appreciate, XML data structures may be communicated as string data.

As discussed above, typically runtime environments (e.g., clients and servers executing applications) manage two heaps. A first heap for small objects (SmallObjectHeap, hereinafter SOH) and a second heap for large objects (LargeObjectHeap, hereinafter LOH). However, in example embodiments, strings (e.g., XML data structures as discussed above) are stored as Smart Strings as discussed above with regard to FIGS. 1-8. Therefore, the XML data structures may be stored in a SOH associated with the system of FIG. 9 (e.g., an SOH stored in the short term storage memory 965).

As a result, in the context of a management system for medical workflows, numerous large strings are created as XML data structures which, for example, describe workflows or information on workflows. Unacceptable LOH fragmentation is reduced, minimized and/or prevented by storing strings in the SOH, and thus to a significant increase in main memory may not be required for the management system for medical workflows. Further, memory blocks allocated to strings being associated with the management system may not be located in the LOH (e.g., containing more memory than 85000 bytes). This may be achieved by allocating memory blocks to strings that are less than the maximum size of a single object located inn the SOH. A garbage collector associated with the runtime environment (e.g. .NET CLR) prevents the fragmentation of the SOH by specific compacting thus reducing, minimizing or even preventing fragmentation.

Figure 10:
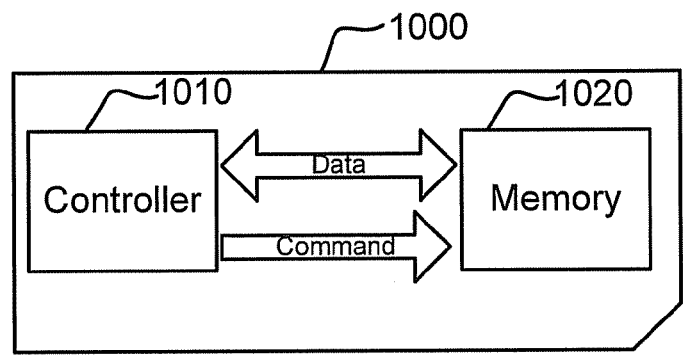
FIG. 10 is a schematic diagram roughly illustrating a memory card 1000 according to at least one example embodiment.

FIG. 10 is a schematic diagram illustrating a memory card 1000 according to example embodiments. Referring to FIG. 10, a controller 1010 and a memory 1020 may exchange electric signals. For example, according to commands of the controller 1010, the memory 1020 and the controller 1010 may exchange data. Accordingly, the memory card 1000 may either store data in the memory 1020 or output data from the memory 1020. The memory 1020 may include the data structure described above in reference to FIG. 1.

Such a memory card 1000 may be used as a storage medium for various devices. For example, the memory card 1000 may be a multimedia card (MMC), a secure digital (SD) card, network server memory, medical workflow management system memory, and the like.

Figure 11:
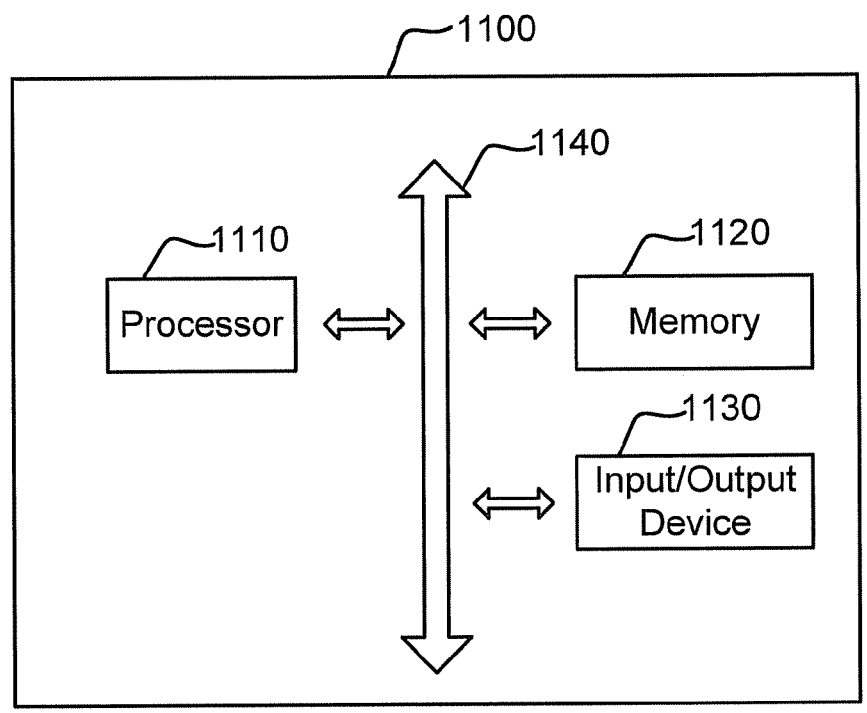
FIG. 11 is a block diagram roughly illustrating an electronic system 1100 according to at least one example embodiment.

FIG. 11 is a block diagram roughly illustrating an electronic system 1100 according to example embodiments. Referring to FIG. 11, a processor 1110, an input/output device 1130, and a memory 1120 may perform data communication with each other by using a bus 1140. The processor 1110 may execute a program and control the electronic system 1100. The input/output device 1130 may be used to input/output data to/from the electronic system 1100. The electronic system 1100 may be connected to an external device, e.g. a personal processor or a network, by using the input/output device 1130 and may exchange data with the external device.

The memory 1120 may store codes or programs for operations of the processor 1110. For example, the memory 1120 may include the data structure described above in reference to FIG. 1. For example, the processor 1110 may be configured to perform the methods described above in reference to FIGS. 1 through 8. For example, the electronic system 1100 may include of the system described above in reference to FIG. 9.

For example, such an electronic system 1100 may embody various electronic control systems requiring the memory 1120, and, for example, may be used in medical devices, media players, navigation devices, network servers, medical workflow management systems, processors, household appliances and the like.

Alternative embodiments of the invention may be implemented as a computer program product for use with a computer system, the processor program product being, for example, a series of processor instructions, code segments or program segments stored on a tangible or non-transitory data recording medium (processor readable medium), such as a diskette, CD-ROM, ROM, or fixed disk, or embodied in a computer data signal, the signal being transmitted over a tangible medium or a wireless medium, for example, microwave or infrared. The series of processor instructions, code segments or program segments can constitute all or part of the functionality of the methods of example embodiments described above, and may also be stored in any memory device, volatile or non-volatile, such as semiconductor, magnetic, optical or other memory device.

Although the above example was described with regard to a computed tomography system, example embodiments are not limited thereto. For example, system may be another imaging system (e.g., MRI). Further, example embodiments are not limited to imaging systems. For example, example embodiments may be related to a clinical study system or other health care management system. Further, as one skilled in the art will appreciate, example embodiments may be related to any system using large string variables such as workflows and/or taskflows, but are not limited thereto.

While example embodiments have been particularly shown and described, it will be understood by one of ordinary skill in the art that variations in form and detail may be made therein without departing from the spirit and scope of the claims. The invention being thus described, it will be obvious that the same may be varied in many ways. Such variations are not to be regarded as a departure from the invention, and all such modifications are intended to be included within the scope of the invention.

I claim:

1. A method of storing characters and strings, the method comprising:
    receiving one of a character and a string;
    determining a part space of an existing array element of a data structure based on a remaining portion of a part capacity of the existing array element and a length of the one of the character and the string; and
    one of,
        (1) storing one of the character and the string in the existing array element if the length of the one of the character and the string is less than or equal to the remaining portion of the part capacity of the existing array element, and
        (2) adding a new array element to the data structure and storing the one of the character and the string in the new array element if the length of the one of the character and the string is greater than the remaining portion of the capacity of the existing array element.

2. The method of claim 1, wherein the part capacity is based on a management rule for a memory heap.

3. The method of claim 2, wherein the memory heap is a SmallObjectHeap (SOH).

4. The method of claim 3, wherein
    the management rule is based on a maximum size of a single object located in the SOH, and
    the part capacity is less than the maximum size of a single object located in the SOH.

5. The method of claim 1, wherein the determining further comprises determining which one of the character, the string, a field of characters and a data structure is to be stored.

6. The method of claim 5, wherein if the character is to be stored, the method further comprises:
    decreasing a first variable value associated with the remaining portion of the part capacity by one; and
    increasing a second variable value associated with an amount of allocated part capacity by one.

7. The method of claim 5, wherein if one of the string and the field of characters is to be stored, the method further comprises:
    storing a value in a variable, the variable being associated with a number of the characters to be stored;
    determining if the value is less than or greater than the remaining portion of the part capacity; and
    storing a subset of the field of characters in the existing array element if the value is greater than the remaining portion of the part capacity.

8. The method of claim 7, further comprising:
    storing a remainder of the subset of the field of characters in the new array element such that a number of characters associated with the remainder of the subset of the field of characters does not exceed a part capacity associated with the new array element.

9. The method of claim 5, wherein the data structure includes one or more character arrays, the one or more character arrays having a length based on a memory management rule.

10. The method of claim 9, wherein if the data structure is to be stored, the method further comprises:
    selecting one of the one or more character arrays; and
    one of,
        (1) appending the selected character array to the existing array element if the length of one of the character and the string is less than or equal to the remaining portion of the part capacity of the existing array element, and
        (2) adding a new array element and appending the selected character array to the new array element if the length of one of the character and the string is greater than the remaining portion of the part capacity of the existing array element.

11. A non-transitory computer readable medium, comprising:
- a data structure including,
  - one or more character arrays, the one or more character arrays having a length based on a management rule for a memory heap, and
  - code segments that when executed by a processor cause the processor to,
    - receive one of a character and a string;
    - determine a part space of an existing array element of a data structure based on a remaining portion of a part capacity of the existing array element and a length of the one of the character and the string; and
    - one of,
      - (1) store one of the character and the string in the existing array element if the length of the one of the character and the string is less than or equal to the remaining portion of the part capacity of the existing array element, and
      - (2) add a new array element to the data structure and store the one of the character and the string in the new array element if the length of the one of the character and the string is greater than the remaining portion of the part capacity of the existing array element.

12. The non-transitory computer readable medium of claim 11, wherein the memory heap is a SmallObjectHeap (SOH).

13. The non-transitory computer readable medium of claim 12, wherein
- the management rule is based on a maximum size of a single object located in the SOH, and
- the part capacity is less than the maximum size of a single object located in the SOH.

14. The non-transitory computer readable medium of claim 11, wherein the code segments, when executed by the processor, further cause the processor to determine which one of the character, the string, a field of characters and a data structure is to be stored.

15. The non-transitory computer readable medium of claim 14, wherein if the character is to be stored, the code segment, when executed by the processor further causes the processor to,
- decrease a first variable value associated with the remaining portion of the part capacity by one; and
- increase a second first variable value associated with an amount of allocated part capacity by one.

16. The non-transitory computer readable medium of claim 14, wherein if one of the string and the field of characters is to be stored, the code segment, when executed by the processor further causes the processor to,
- store a value in a variable, the variable being associated with a number of the characters to be stored;
- determine if the value is less than or greater than the remaining portion of the part capacity; and
- store a subset of the field of characters in the existing array element if the value is less than is greater than the remaining portion of the part capacity.

17. The non-transitory computer readable medium of claim 16, the code segment, when executed by the processor further causes the processor to,
- store a remainder of the subset of the field of characters in the new array element such that a number of characters associated with the remainder of the subset of the field of characters does not exceed a part capacity associated with the new array element.

18. The non-transitory computer readable medium of claim 14, wherein if the data structure is to be stored, the code segment, when executed by the processor, further causes the processor to,
- select one of the one or more character arrays; and
- one of,
  - (1) append the selected character array to the existing array element if the length of one of the character and the string is less than or equal to the remaining portion of the part capacity of the existing array element, and
  - (2) add a new array element and append the selected character array to the new array element if the length of one of the character and the string is greater than the remaining portion of the part capacity of the existing array element.

19. A medical workflow management system, comprising:
a processor; and
a memory configured to store a data structure, the data structure including,
- one or more character arrays, the one or more character arrays having a length based on a management rule for a memory heap, and
- code segments that when executed by the processor cause the processor to,
  - receive one of a character and a string;
  - determine a part space of an existing array element of a data structure based on a remaining portion of a part capacity of the existing array element, and a length of the one of the character and the string, and
  - one of,
    - (1) store one of the character and the string in the existing array element if the length of the one of the character and the string is less than or equal to the remaining portion of the part capacity of the existing array element, and
    - (2) add a new array element to the data structure and store the one of the character and the string in the new array element if the length of the one of the character and the string is greater than the remaining portion of the part capacity of the existing array element.

20. The medical workflow management system of claim 19, wherein
- the memory heap is a SmallObjectHeap (SOH),
- the management rule is based on a maximum size of a single object located in the SOH, and
- the part capacity is less than the maximum size of a single object located in the SOH.

* * * * *